United States Patent
Smeets et al.

(10) Patent No.: US 7,020,456 B2
(45) Date of Patent: Mar. 28, 2006

(54) METHOD AND SYSTEM FOR AUTHENTICATION OF UNITS IN A COMMUNICATIONS NETWORK

(75) Inventors: Ben Smeets, Dalby (SE); Christian Gehrmann, Lund (SE); Allan Bøgeskov, Aalborg (DK)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 532 days.

(21) Appl. No.: 10/005,080

(22) Filed: Dec. 7, 2001

(65) Prior Publication Data

US 2002/0132605 A1 Sep. 19, 2002

Related U.S. Application Data

(60) Provisional application No. 60/257,149, filed on Dec. 22, 2000.

(30) Foreign Application Priority Data

Dec. 8, 2000 (DK) .......................... 2000 01844
Mar. 6, 2001 (EP) ............................ 01610019

(51) Int. Cl.
*H04M 1/66* (2006.01)

(52) U.S. Cl. ............... 455/411; 455/410; 455/403; 455/517; 379/161; 380/247; 380/248; 380/249; 380/250

(58) Field of Classification Search ............ 455/411, 455/410, 403, 517, 456, 41; 379/161; 380/247–250, 380/9, 24; 340/825.54, 928
See application file for complete search history.

(56) References Cited

U.S. PATENT DOCUMENTS 5,729,537 A * 3/1998 Billstrom .................... 370/329

5,765,106 A * 6/1998 Violante et al. ............. 455/410
5,809,142 A * 9/1998 Hurta et al. .................. 705/68

(Continued)

FOREIGN PATENT DOCUMENTS

EP            0 944 203          9/1999
WO            WO 99/56194        11/1999

OTHER PUBLICATIONS

"Specification of the Bluetooth—Core", VER. 1.0B, dated Dec. 1, 1999, available from www.bluetooth.com.
T. Dierks et al.: "The TLS Protocol Version 1.0", IETF RFC 2246, ftp://ftp.isi.edu/in–notes/rfc2246.text.
R. Atkinson: "Security Architecture for the Internet Protocol", IETF RFC 2401, ftp://ftp.isi.edu/in–notes/rfc2401.txt.
International Search Report mailed on Aug. 5, 2002 in connection with counterpart International Application No. PCT/EP01/13702.
Asokan N. et al., "Key agreement in ad hoc networks", Computer Communications, Elsevier Science Publishers BV, Amsterdam, NL, vol. 23, No. 17, Nov. 1, 2000, pp. 1627–1637.

*Primary Examiner*—Sonny Trinh
*Assistant Examiner*—Khai Nguyen
(74) *Attorney, Agent, or Firm*—Potomac Patent Group PLLC (57) ABSTRACT

A method of granting, to a user communications device, access to a service provided by a plurality of service communications devices where an access key code is generated during an initial communications session between the user communications device and one of the service communications devices. The established access key code is subsequently stored in the user communications device and made available to the service communications devices for use in subsequent communications sessions between the user communications device and any one of the service communications devices. The invention further relates to a communications system and a user communications device.

25 Claims, 6 Drawing Sheets

U.S. PATENT DOCUMENTS

| | | | | |
|---|---|---|---|---|
| 5,826,186 A | * | 10/1998 | Mitchell et al. | 455/410 |
| 5,926,546 A | * | 7/1999 | Maeda et al. | 705/65 |
| 6,084,967 A | * | 7/2000 | Kennedy et al. | 380/247 |
| 6,128,389 A | * | 10/2000 | Chan et al. | 380/247 |
| 6,157,826 A | * | 12/2000 | Lee | 455/411 |
| 6,275,707 B1 | * | 8/2001 | Reed et al. | 455/456.3 |
| 6,321,094 B1 | * | 11/2001 | Hayashi et al. | 455/517 |
| 6,631,271 B1 | * | 10/2003 | Logan | 455/456.1 |
| 6,633,757 B1 | * | 10/2003 | Hermann et al. | 455/414.1 |
| 6,650,880 B1 | * | 11/2003 | Lee et al. | 455/259 |
| 6,657,538 B1 | * | 12/2003 | Ritter | 340/5.81 |
| 6,658,392 B1 | * | 12/2003 | Yoshida | 705/13 |
| 6,745,326 B1 | * | 6/2004 | Wary | 713/168 |
| 6,748,195 B1 | * | 6/2004 | Phillips | 455/41.2 |
| 2002/0019223 A1 | * | 2/2002 | Lee et al. | 455/411 |

* cited by examiner

METHOD AND SYSTEM FOR AUTHENTICATION OF UNITS IN A COMMUNICATIONS NETWORK

This application claims benefit of 60/257,149 filed Dec. 22, 2000.

FIELD OF THE INVENTION

This invention relates to the authentication of units in a communications network and, more specifically, the authentication of units in a Bluetooth™ (Bluetooth is a trademark owned by Telefonaktiebolaget LM Ericsson, Sweden) network.

BACKGROUND OF THE INVENTION

Wireless communications technologies are frequently used for a wide variety of applications, such as remote controls, wireless network connections of computers, e-commerce applications or the like. In many applications it is desired to establish a secure communications link between two or more communications devices. This may for example be desired in order to minimise the risk of unauthorised use or misuse or the risk of unauthorised retrieval of information transmitted via the communications link. Hence, effective authentication and encryption schemes are desired in order to mutually authenticate the devices participating in a communication, and to be able to encrypt the information transmitted via a communications link.

These mechanisms are typically implemented on the basis of secret keys which are known by the communicating devices, and which may be used to authenticate the corresponding other device and/or to encrypt transmitted information.

In a situation where a user communications device may connect to multiple other communications devices, a large number of possible combinations of communicating devices exist. This may occur in a situation where a user carrying a user communications device may gain access to a service via multiple service communications devices.

The Bluetooth technology is an example of a short-range wireless communications technology. The Bluetooth technology enables different units to communicate at a high speed and may be used in a variety of applications including ad-hoc networks of computers and other electronic equipment, e-commerce applications where a portable electronic user communications device may be used as an electronic ticket or key. The user communications device, e.g. a mobile phone, may connect to a service communications device which may grant or deny access to a location or a service.

In many of the above examples there is a need for a fast authentication of a communications unit or to set up a secure encrypted link between two communications units.

It is known from the Bluetooth specifications (see Bluetooth SIG: "Specification of the Bluetooth system", Version 1.0B, 1. December 1999, to create security associations between different Bluetooth units, to authenticate units and to encrypt communications links. The Bluetooth baseband security mechanisms perform authentication and encryption based on shared secret link keys between two Bluetooth units.

However, the above prior art solution is only concerned with two main types of link keys: combination keys and unit keys. A combination key is unique to each combination of Bluetooth units. A unit key is unique to a certain unit and this unit uses this unit key for all its connections.

Hence, in a situation with a large number of possible combinations of communicating units, the use of combination keys implies that each unit may have to store a combination key for every possible other communications device with which it may communicate. This solution requires a large amount of storage capacity in a communications unit for storing a large number of combination keys. Furthermore, if new communications devices are put into service or communications devices are replaced with others, the lists of combination keys in many other communications devices may have to be updated.

The use of unit keys, on the other hand, has the disadvantage that it only provides a lower level of security, because the same key is used for a large number of connections. Furthermore, this solution does not allow the use of different security levels for different communications links.

Furthermore, the above prior art method requires an initialisation or pairing procedure between two units in order to create a link key between those two units. Hence, it is a disadvantage of the above prior art method that a user may have to pair his or her device with all possible communications devices with which he or she may want to communicate.

SUMMARY OF THE INVENTION

The above and other problems may be solved according to the invention by a method of granting, to a user communications device, access to a service provided by a plurality of service communications devices, the method comprising the steps of initiating a first communications link between the user communications device and a first one of the plurality of service communications devices;

generating an access key code;

storing a first data item in a first storage means of the user communications device, the first data item indicating the access key code.

According to the invention the method is characterised in that the access key code is indicative of the user communications device and the service; and the method further comprises the steps of making the access key code available to at least a second one of the plurality of service communications devices via a communications network;

initiating a second communications link between the user communications device and the second service communications device; and using the access key code to mutually authenticate the user communications device and the second service communications device.

Consequently, an access key code is generated during an initial communications session between the user communications device and one of the service communications devices. The established access key code is subsequently stored in the user communications device and made available to the service communications devices. Therefore, the access code may be used in subsequent communications sessions between the user communications device and any one of the service communications devices. It is an advantage of the invention that only one access key code for the service needs to be stored in the user communications device, thereby saving storage capacity in the user communications device. It is a further advantage of the invention that a fast authentication may be performed in subsequent sessions on the basis of the established access key code. As the access key is specific to the service provided by the plurality of service communications devices, the access key code may be used for unit authentication in connection with any of the service communications devices providing that service and with access to the access key. It is a further advantage of the invention that different security levels may be applied to different services.

As the access key is made available via a communications network to other service communications devices providing that service, a secure infrastructure for the distribution of access keys is provided. The communications network may be a LAN or any other suitable network connection, preferably a secure network connection, e.g. protected by standard methods, such as TLS, IPsec, or the like.

A service according to the invention may be any service provided by a service provider to a user which includes transactions between a user communications device and service communications devices. Examples of such services include the payment of tickets to e.g. public transportation, museums, concerts, etc., an access control of buildings, areas, etc., a registration of the time of arrival/departure of employees etc., e-commerce applications, network access such as LAN or Internet access, or the like.

The communications links may use any suitable communications channel, including a wireless communications link, e.g. radio-based, infrared or the like.

The user communications device may be any electronic equipment or part of such electronic equipment, where the term electronic equipment includes computers, such as stationary and portable PCs, stationary and portable radio communications equipment. The term portable radio communications equipment includes mobile radio terminals such as mobile telephones, pagers, communicators, e.g. electronic organisers, smart phones, PDAs, or the like.

The first storage means may for example be a physical memory, such as a RAM, EPROM or EEPROM, in the user communications device or an allocated part of the memory of a processing unit of the user communications device, a smart card, a storage medium, such as a hard-disk, or the like.

The service communications devices may comprise a communications unit, such as a radio transceiver, an infrared emitter/sensor, or the like. The service communications device may further comprise a processing unit and a memory for storing access key codes. Furthermore, the service communications device may comprise a network interface for connecting the device with other service communications devices and/or a computer system. The service communications device may further comprise a user interface for additional user interaction and a control unit for generating a control signal based upon the results of an interaction with a user communications device.

In a preferred embodiment of the invention the communication is compliant with the Bluetooth standard, i.e. the user communications device and the plurality of service communications devices each comprise a Bluetooth communications unit;
the first and second communications links are Bluetooth communications links;
the access key code is a baseband link key; and
the step of generating an access key code is part of a Bluetooth pairing procedure.

It is an advantage of the invention that it allows the use of the fast Bluetooth baseband security mechanisms for several service situations, e.g. Bluetooth e-commerce applications, without changing the basic functionality in the Bluetooth standard.

In a further preferred embodiment of the invention, the user communications device is a mobile radio terminal.

When the first service communications device is a designated subscription communications device, the step of generating access key codes may be localised at a small number of devices, thereby keeping the processing and memory requirements for the majority of the service communications devices simple. A designated subscription communications device may be a first point of access where the user subscribes to the service, or validates a previously received subscription, for example via a PIN code.

In a preferred embodiment of the invention, the method further comprises the steps of
transmitting a service identification code from the first service communications device to the user communications device via the first communications link;
storing a second data item in the first storage means in relation to the access key code, the second data item indicating the service identification code; and
the step of using the access key code to mutually authenticate the user communications device and the second service communications device further comprises the steps of
transmitting the service identification code from the second service communications device to the user communications device via the second communications link; and
retrieving, based on the service identification code, the access key code from the first storage means.

Consequently, the service identification code identifies the service provided by the service communications devices, and the service identification code may be used to select the suitable access key code when connecting to any of the service communications devices providing that service. Hence, the access key code may be selected with reference to the service only, without knowing the exact identity of the service communications device. It is an advantage of the invention that it provides fast authentication with multiple service communications devices.

When the step of storing the first data item in the first storage means comprises the step of storing a data set indicating an identification code of at least one of the plurality of service communications devices, the identification code may be used in subsequent communications session, thereby increasing the security of the system.

When the method further comprises the step of using the access key code to generate an encryption key for encrypting the second communications link, the encryption key may be used to protect the communication between the user communications device and the second service communications device, thereby providing an encryption set-up for the communication between the user communications devices and the service communications devices. Consequently, it is an advantage of the invention that it provides secure communications links.

The access key code may be generated in the user communications device and transmitted from the user communications device to the first service communications device. Alternatively, the access key code may be generated in the first service communications device and transmitted from the first service communications device to the user communications device.

Alternatively, in a preferred embodiment of the invention, the step of generating an access key code comprises the steps of generating a first part of the access key code in the user communications device; generating a second part of the access key code in the first service communications device; transmitting the first part of the access key code from the user communications device to the first service communications device; and transmitting the second part of the access key code from the first service communications device to the user communications device. It is an advantage of this embodiment that a high degree of security is achieved.

In a preferred embodiment of the invention, the step of making the access key code available to at least a second one of the plurality of service communications devices via a communications network comprises the steps of transmitting the access key code to the second service communications device; and storing a third data item in a second storage means of the second service communications device, the third data item indicating the access key code.

Hence, the access key code may be transmitted in a fast and efficient manner to all other, or at least all relevant, service communications devices used in subsequent communications sessions. As the access key codes are stored locally in the service communications devices, a fast authentication of user communications devices may be achieved. Furthermore, the subsequent authentication does not rely on the availability of a communications network or external storage devices during the actual authentication.

The second storage means may for example be a physical memory, such as a RAM, EPROM or EEPROM, in the service communications device or an allocated part of the memory of a processing unit of the user communications device, a smart card, a storage medium, such as a hard-disk, or the like.

In another preferred embodiment of the invention, the step of making the access key code available to at least a second one of the plurality of service communications devices via a communications network comprises the step of storing a fourth data item in a database, the fourth data item indicating the access key code; and the step of using the access key code to mutually authenticate the user communications device and the second service communications device comprises the steps of retrieving the access key code from the database; and transmitting the retrieved access key code via the communications network to the second service communications device.

According to this embodiment of the invention, the access key codes may be stored in a central database, e.g. on a storage medium such as a hard-disk or CD-ROM of a database server. In this case the access key codes may be transmitted to the individual service communications devices during an actual authentication session. It is an advantage of this embodiment that little storage capacity is required in the individual service communications devices. It is a further advantage of this embodiment that the access key codes may easily be managed by a central key management system. Alternatively, the database may be a simple file structure on a storage medium, such as a hard-disk or CD-ROM.

When the step of initiating the first communications link comprises the step of exchanging an initial access key, additional security during the initial communications session is provided.

The invention further relates to a communications system comprising a user communications device, a first and a second service communications device, the first and second service communications devices each providing a service;

the user communications device and the first and second service communications devices each including a respective transmit/receive unit for transmitting and receiving data signals via respective communications links between the user communications device and a selected one of the first and second service communications devices;

a selected one of the user communications device and the first service communications device comprising first processing means adapted to generate at least a part of an access key code during an initialisation procedure of a first communications link between the user communications device and the first service communications device, the access key code being indicative of the user communications device and the service;

the user communications device including first storage means adapted to store a first data item indicating the access key code; and second processing means adapted to retrieve the access key code from the first storage means and to use the retrieved access key code during an authentication procedure of a second communications link between the user communications device and the second service communications device;

the system including a communications network interconnecting the first and second service communications devices and adapted to make the access key code available to at least the second service communications device;

the second service communications device including third processing means adapted to receive the access key code via the communications network and to use the received access key code during the authentication procedure of the second communications link.

Preferably, the transmit/receive units may be communications units for wireless communications, e.g. radio-based, infrared or the like. In a preferred embodiment of the invention they are Bluetooth transceivers.

The processing means may be a CPU of a computer, a microprocessor, a smart card, or the like.

The storage means may for example be a physical memory, such as a RAM, EPROM or EEPROM, an allocated part of the memory of a processing unit, a smart card, a storage medium, such as a hard-disk, or the like.

The invention further relates to a user communications device comprising a first transmit/receive unit for transmitting data signals to and receiving data signals from selected ones of a plurality of service communications devices providing a service;

first storage means adapted to store a first data item indicating an access key code generated during an initialisation procedure of a first communications link between the user communications device and a first one of the plurality of service communications devices, the access key code being indicative of the user communications device and the service;

first processing means adapted to retrieve the access key code from the first storage means and to use the retrieved access key code during an authentication procedure of a second communications link between the user communications device and a second one of the plurality of service communications devices.

The invention further relates to a communications system comprising a first and a second service communications device each providing a service;

the first service communications device including a first transmit/receive unit for transmitting data signals to and receiving data signals from a user communications device via a first communications link;

first processing means adapted to perform an initialisation procedure of the first communications link, the initialisation procedure including the generation of an access key code indicative of the user communications device and the service;

the system including a communications network interconnecting the first and second service communications devices and adapted to make the access key code available to at least the second service communications device;
the second service communications device including
a second transmit/receive unit for transmitting data signals to and receiving data signals from the user communications device via a second communications link;
second processing means adapted to receive the access key code via the communications network and to use the received access key code during an authentication procedure of the second communications link.

As the advantages of the communications systems and the user communications device according to the invention and their respective preferred embodiments correspond to advantages of the method and its corresponding embodiments described above and in the following, these will not be described again.

In the following, the invention will be described in connection with the Bluetooth technology. However, it is understood that a person skilled in the art will be able to adapt the invention to other wireless communications technologies.

BRIEF DESCRIPTION OF THE DRAWINGS

The invention will be explained more fully below in connection with preferred embodiments and with reference to the drawings, in which.

DETAILED DESCRIPTION OF PREFERRED EMBODIMENTS

Figure 1:
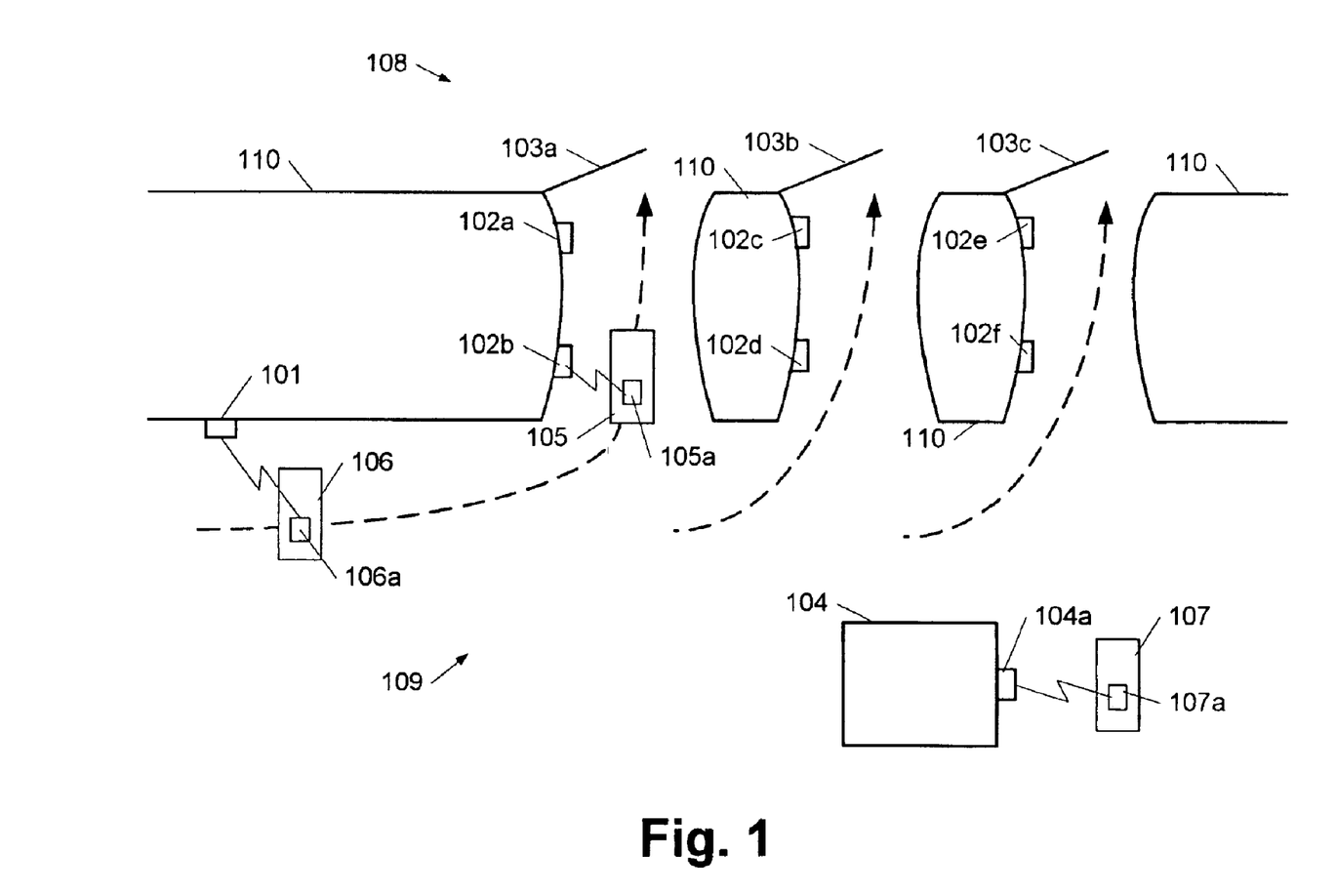
FIG. 1 shows an example of a situation where the method according to the invention may be applied.

FIG. 1 illustrates the use of a Bluetooth mobile phone for public transport ticketing as an example of an application of the invention.

In this example, we consider the situation where public transport customers 105–107 have the opportunity to subscribe to a service where they are able to use a mobile phone 105a–107a, respectively, as a user communications device for the storing and presentation of an electronic ticket for the underground transport. A solution using Bluetooth transceivers 102a–f at the underground gates 103a–c as service communications devices is shown in FIG. 1.

Customers 105–107 enter the underground via a lobby area 109 which is separated from the underground platform area 108 by walls 110 with gates 103a–c. Only customers with a valid ticket are allowed to pass through the gates 103a–c.

In the example of FIG. 1, a Bluetooth "pre-scanning" transceiver 101 scans for all Bluetooth units entering the underground area. When the transceiver 101 has established a connection to an approaching Bluetooth unit 106a, information about the approaching unit 106a is forwarded by the transceiver 101 to the transceivers 102a–f at the gates 103a–c. Based on that information, the transceivers 102a–f may page the Bluetooth units that pass the gates, and one of the transceivers 102b may grant access to a Bluetooth unit 105a, if it is authenticated or if it can present a valid electronic ticket over the corresponding Bluetooth link. Hence, this is an example of an application where the time of interaction between the Bluetooth unit 106a and the transceiver 102b should not exceed the time it takes the customer 106 to walk through the gate 103a.

In the example of FIG. 1, a user 107 who arrives in the underground area 109 and who has not yet subscribed to the electronic ticket service, may subscribe to the service by connecting his Bluetooth device 107a to a Bluetooth access point 104 of the service provider via a Bluetooth service device 104a. At the access point 104, the customer 104 may perform a payment transaction, select a desired subscription, and receive a link key. With the link key, the user's Bluetooth device 107a may subsequently establish secure Bluetooth connections with the Bluetooth transceivers 101 and 102a–f.

In the above example there may be a rather large number of different Bluetooth transceivers, as there may be several transceivers at each subway station, and an approaching Bluetooth unit 105a–107a should be able to connect to any of the different Bluetooth transceivers. Consequently, it would be inefficient to demand that all the different distributed Bluetooth transceivers 101, 102a–f should share a different combination key with any user Bluetooth unit 105a–107a that has subscribed to the service. Hence, it is disadvantageous to use a combination key for the service considered in this example. On the other hand, when using a unit key for authentication, a user communications device would not be able to have different security levels for different links that it uses, because, according to the Bluetooth specification, a unit key is used for all the connections of a Bluetooth unit.

Figure 2:
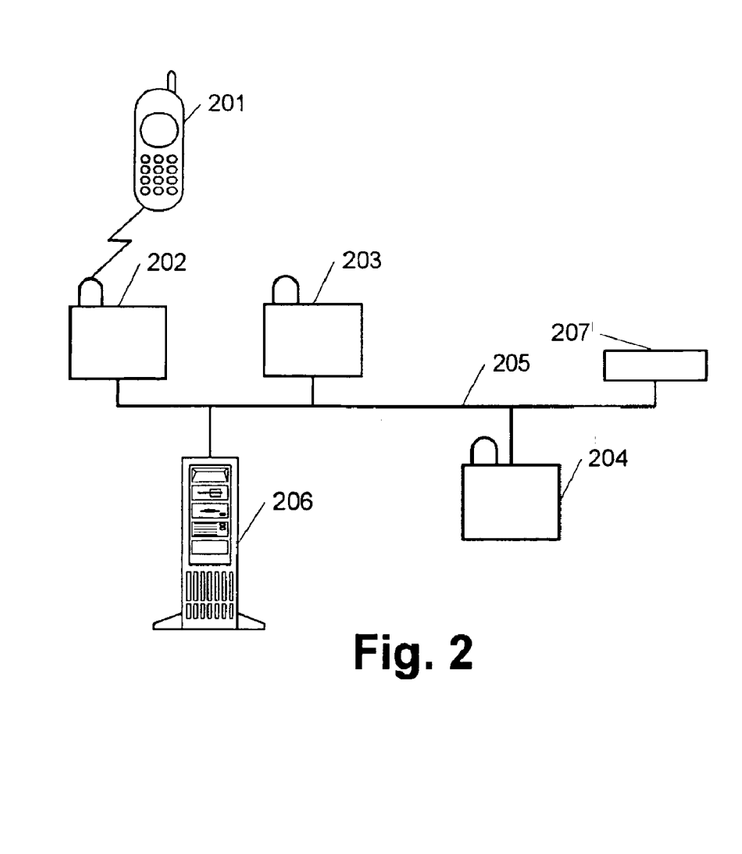
FIG. 2 shows an example of a communications system with a user communications device and three service communications devices.

Now referring to FIG. 2, a framework for the use of the Bluetooth security features in a network of Bluetooth units, e.g. a Bluetooth Personal Area Network (PAN) with access point roaming (APR) capabilities, is described. Personal Area Networking for Bluetooth equipped devices may be specified in a Bluetooth PAN profile specification.

A Personal Area Network (PAN) may be formed with the purpose of accessing an external network (i.e. a network external to the Bluetooth PAN, e.g. a LAN), through one of the service communications devices providing access to a network, so-called PAN Network Access Points (NAP)

202–204 of the network. The devices providing or requesting services may set the level of security of a communications session. Any device participating in a Bluetooth PAN may demand a certain level of security and, subsequently, reject a lower level of security.

FIG. 2 illustrates a user communications device 201 which has established a wireless connection to a network access point (NAP) 202. The NAP 202 is connected via a communications network 205, e.g. a LAN, to other NAPs 203–204. The network 205 may also provide connections to other equipment, such as a server 206 and a gateway 207 which provides access to external networks, e.g. a WAN or the Internet.

As mentioned above, Bluetooth security procedures provide two mechanisms for security, namely authentication and encryption. Bluetooth provides a layered hierarchy of communications protocols, the so-called Bluetooth protocol stack. The Bluetooth protocol stack comprises the baseband layer which provides a physical RF link using frequency hopping spread spectrum technology where packets are transmitted in defined time slots and on defined frequencies. The protocol stack further comprises a link manager protocol (LMP) which is responsible for the link set-up between Bluetooth devices. On top of these and other Bluetooth protocols, higher-level applications and application-oriented protocols may be implemented. The above mentioned security mechanisms operate on the Baseband level and are controlled by the LMP. The security procedures are based on access to a shared secret key, the passkey, between the two devices. Based on the passkey, a common access key code, the link key, is exchanged between the devices during an initialisation procedure called pairing.

With reference to FIG. 2, a framework for the use of the Bluetooth security procedures for a solution with multiple Network Access Points is described.

A user communications device 201 that uses the services of a Network Access Point, in the following referred to as a PAN User (PANU), is able to gain access to one or more services through a NAP 202. The NAP 202 as well as the PANU 201 may require a certain level of security as part of the service establishment.

Authentication and encryption is based on a bond between two Bluetooth devices. The initial step before performing authentication and encryption is to pair the two devices 201 and 202 and to establish a common link key between the two devices 201 and 202. Pairing is based upon the Bluetooth device address (BD_ADDR) of the devices 201 and 202.

When a user communications device 201, e.g. a mobile station, enters the NAP coverage area and detects the presence of a NAP 202, a part of the connection establishment procedure may be that either the NAP 202 or the PANU 201 requests that security procedures should be invoked.

Examples of security levels include:
No security (mode 1)
Service level requested security (mode 2)
Security solicited by link level (mode 3)

The mentioned security modes are part of the Generic Access Profile, GAP (see Bluetooth SIG, Specification of the Bluetooth system, Profiles, Part K:1 "Generic Access Profile", Version 1.0B, 1 Dec. 1999, at http://www.bluetooth.com/). How they may be supported in a PAN environment with support for APR is described below.

If the mobile station 201 and the NAP 202 are in security mode 1, neither the mobile node nor the NAP requires security procedures to be invoked. Hence, this case needs no further considerations.

If the mobile station 201 and the NAP 202 are in security mode 2, the use of security procedures is not required before the link setup is completed. Security may be implemented at a higher-level layer of the communications stack, e.g. it may be invoked by a service layer. Thus, it is possible to set up a connection and retrieve information about the NAP and the system to which the NAP is connected before the security is established.

In security mode 3, security is enforced by the link layer and requires the security procedures to be executed before the link setup is completed, i.e. receiving a "LMP_setup_complete" message. Thus there is an inter-dependency with regard to the exchange of the BD_ADDR (Bluetooth Device Address) parameter of allowed devices. If no link key exists, pairing is initiated using the common passkey which must be known and distributed to both units in advance.

Applying Bluetooth security procedures in a configuration as depicted in FIG. 2 poses the challenge of supporting security between a PANU 201 and multiple NAPs 202–204. Further, it is possible that the NAP may be part of different logical networks. For example, applying the Bluetooth security level 2, as described above, information about one of the NAPs 202–204 may be retrieved by means of the Service Discovery Protocol (SDP). The normal NAP service record contains information about the security required, i.e. authentication and/or encryption. Additional information which may be used to support security in an APR environment is outlined in table 1.

TABLE 1

SDP service information

| Parameter | Description |
| --- | --- |
| Service provider identity | Unique identity of the service provider managing the system to which the NAP is connected |
| Service provider name | Name of service provider |
| Logical network identity | Unique identity of connected network connected |
| Logical network name | Name of logical network connected to |
| Security key support | Support for security key distribution. Values:<br>- none<br>- passkey<br>- link key. |
| Higher layer security protocol | Identification of the higher layer protocols supported (WTLS, IPSec, etc.) |

The information retrieval is needed in order to identify the NAP 202 as member of a logical network handled by a known service provider; this may be required in situations where several service providers are present in the same area, as may be the case in public hot spot areas. In this situation, the PANU 201 may use the SDP service information to correlate against wanted service provider identity and/or logical network identity.

Figure 3A:
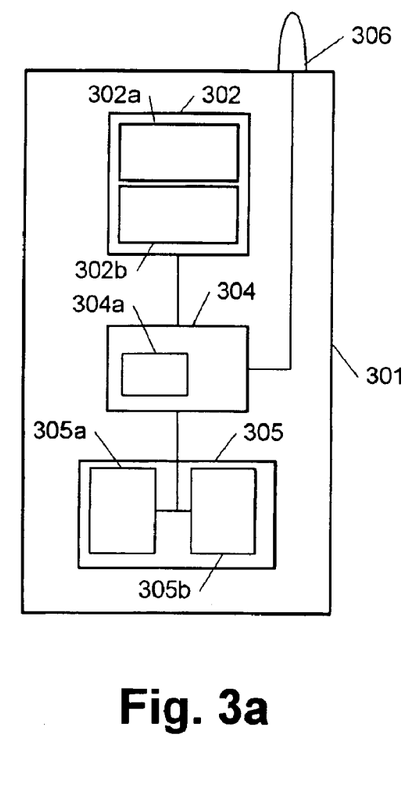
FIG. 3a shows a block diagram of an embodiment of a user communications device.

FIG. 3a shows a block diagram of an embodiment of a user communications device. The user communications device comprises a Bluetooth transceiver 306 for transmitting and receiving radio signals according to the Bluetooth technology to/from a service communications device. The transceiver 306 is connected to a processing unit 304, e.g. a microprocessor, including a RAM 304a. The processing unit 304 is connected to a memory unit 305 which may comprise a ROM section 305a and an EPROM/EEPROM section 305b. In the ROM section computer-executable program code is stored which, when loaded in the processing unit 304, implements the software applications of the device 301, such as the different layers of the Bluetooth protocol, security and encryption software, application software for managing service-specific functionality, such as displaying the status of a subscription, or the like. In the EPROM/EEPROM section, application data may be stored, such as PIN codes, subscription data, link keys, service IDs, etc. The processing unit 304 is further connected to a user interface unit 302 which comprises a display 302*a* and a keypad 302*b*. The display 302*a* may be used for displaying subscription information, e.g. the number of trips left on the user's account. The keypad 302*b* may be used for entering PIN codes, selecting different services, acknowledging payments, etc. Alternatively or additionally, the user interface unit 302 may comprise other input means, such as a touch screen.

Figure 3B:
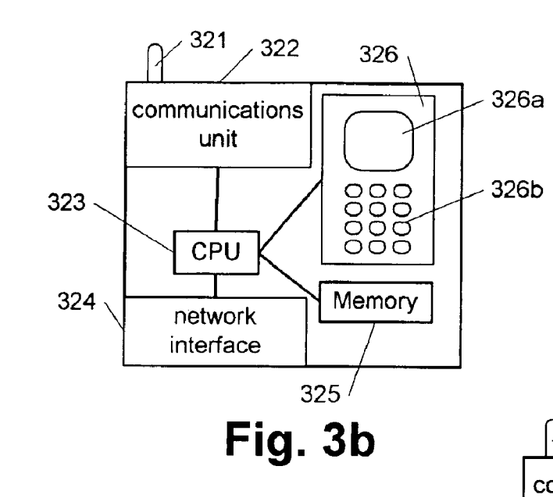
FIG. 3b shows a block diagram of a first embodiment of a service communications device.

FIG. 3*b* shows a block diagram of a first embodiment of a service communications device, e.g. a NAP shown in FIG. 2 or the access point 104 shown in FIG. 1. The service communications device comprises a Bluetooth transceiver 321 connected to a communications unit 322, which controls the transmission and reception of radio signals via the transceiver 321 and controls the link set-up with a user communications device. The communications unit is connected to a CPU 323, which provides an application layer interface to the user communications device and sends and receives user data to/from the user communications device via the communications unit 322 and the Bluetooth transceiver 321. The CPU 323 is connected to a memory unit 325, which may comprise a memory such as RAM, ROM, EPROM and/or EEPROM and/or a storage medium such as a hard-disk, CD-ROM, or the like. The CPU 323 is further connected to a user interface unit 326 comprising a display 326*a* and a keypad 326*b* and/or other input means, e.g. a touch screen. The CPU is further connected to a network interface unit 324, which provides an interface to an external network, e.g. the network 205 shown in FIG. 2.

Alternatively or additionally, the service communications device may be connected, e.g. via a LAN, to a server computer executing at least part of the application software, e.g. for the management of link keys, subscription management, etc., and which may provide at least part of the storage capacity of the service communications device, e.g. RAM or another storage medium such as a hard-disk.

Figure 3C:
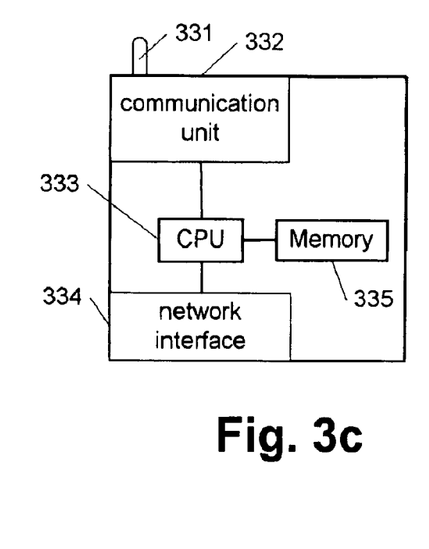
FIG. 3c shows a block diagram of a second embodiment of a service communications device.

FIG. 3*c* shows a block diagram of a second embodiment of a service communications device. The service communications device comprises a Bluetooth transceiver 331 connected to a communications unit 332, which controls the transmission and reception of radio signals via the transceiver 331 and controls the link set-up with a user communications device. The communications unit is connected to a CPU 333, which provides an application layer interface to the user communications device and sends and receives user data to/from the user communications device via the communications unit 332 and the Bluetooth transceiver 331. The CPU 333 is connected to a memory unit 335, which may comprise a memory such as RAM, ROM, EPROM and/or EEPROM and/or a storage medium such as a hard-disk, CD-ROM, or the like. The CPU is further connected to a network interface unit 334, which provides an interface to an external network, e.g. the network 205 shown in FIG. 2.

Figure 4:
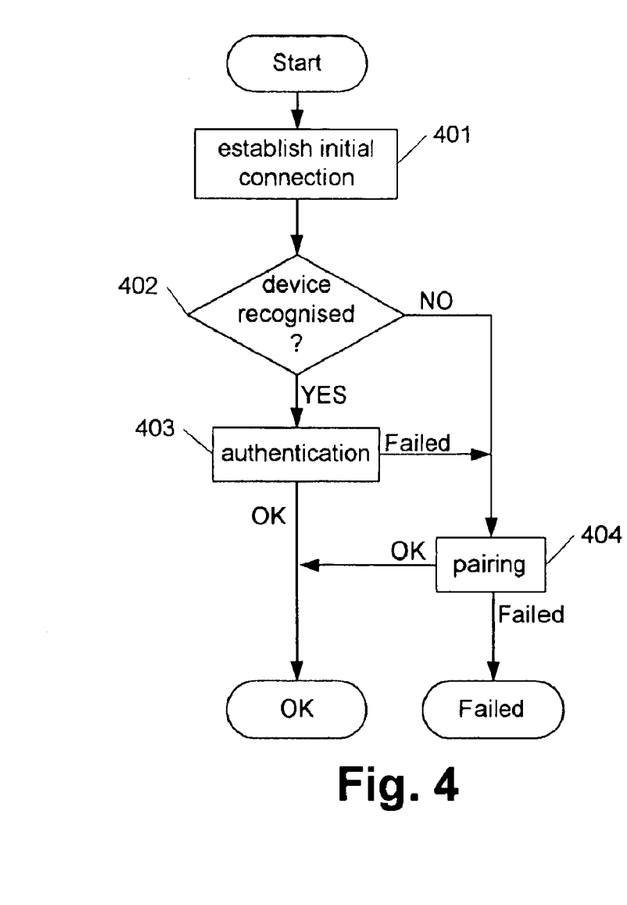
FIG. 4 shows a process of establishing a Bluetooth link between a user communications device and a service communications device according to an embodiment of the invention.

Now referring to FIG. 4, the process of establishing a Bluetooth link between a user communications device and a service communications device according to an embodiment of the invention comprises the step 401 of establishing an initial connection between the devices. If, during a device discovery procedure 402, the other device is recognised, a common link key exists and the authentication procedure 403 may be performed. If the device is unknown, a pairing procedure 404 is performed. The pairing procedure may comprise the generation of a temporary initialisation key which is derived from a passkey and which is to be used during the initial session, the authentication based on the initialisation key, and the generation and exchange of a link key.

Figure 5A:
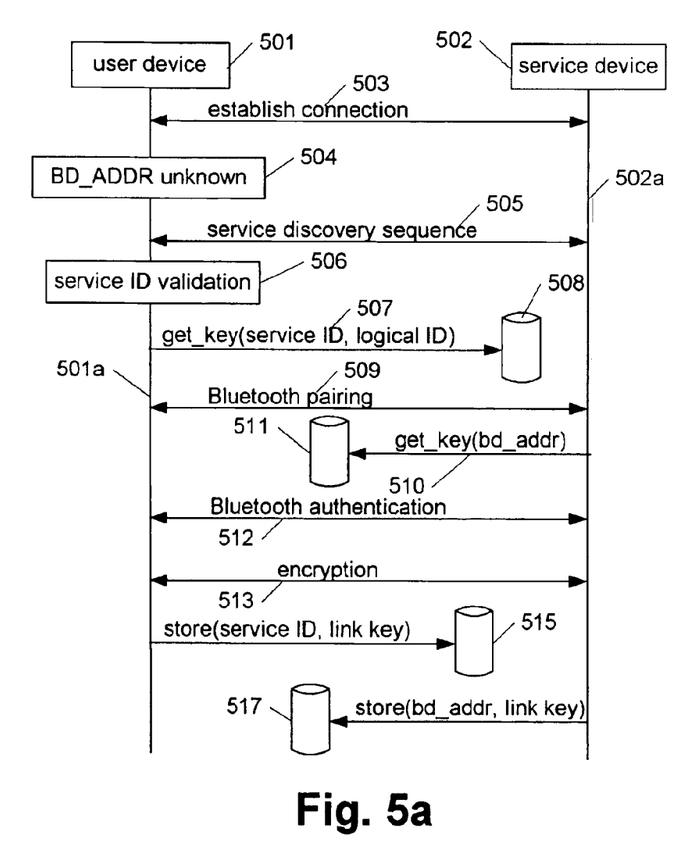
FIG. 5a shows a first example of the message flow of an initial session between a user communications device and a service communications device according to an embodiment of the invention.

FIG. 5*a* illustrates a first example of the message flow of an initial session between a user communications device and a service communications device according to an embodiment of the invention. The initial security procedures are invoked for instance in the situation that a PANU registers at a new NAP not known to the PANU. Since the PANU may connect to any NAP in the system, the information in the SDP record may, preferably, be used by the PANU to identify and validate whether the relevant service is available.

The messages and message sequences between the user communications device 501 and the service communications device 502 are illustrated as horizontal arrows between the two vertical lines 501*a* and 502*a* representing the user communications device 501 and the service communications device 502, respectively. An initial connection between the user communications device 501 and the service communications device 502 is established by the message sequence 503. The user communications device 501 attempts to recognise the service communications device 502 on the basis of the BD_ADDR received during the establishment of the initial connection. If the service communications device is not recognised (step 504), a pairing based upon a passkey is initiated. The passkey is distributed in advance and associated with the service provider identity. On the user communications device 501 this may be part of obtaining a subscription for a specific service. On the service communications device 502 this may be handled through a management system which distributes the passkey between all access point in the logical network. The management system may for example be executed on the server 206 shown in FIG. 2.

The user communications device may receive a service ID during a service discovery sequence 505. In step 506, the user communications device 501 verifies whether the received service ID corresponds to the desired service. Subsequently, the user communications device 501 may look up the received service ID in the internal database 508, e.g. via a "get key" function 507, and find the associated passkey. If no record exists, the session may be terminated or continued without enabling any security.

Based on the passkey, a pairing sequence 509 may be initiated. During the pairing, the service communications device 502 may look up the passkey in a system database 511 based on the BD_ADDR of the user communications device.

Furthermore, a link key is generated during the pairing. The link may be generated in the user communications device 501 or the service communications device 502 and sent to the respective other communications device. Preferably, the exchange of the link key is secured, e.g. by performing an XOR operation with a secret initialisation key known to both communications devices prior to the exchange.

Alternatively, both the user communications device 501 and the service communications device 502 may generate respective parts of the link key and send the generated parts to the corresponding other communications device. In this case, the user communications device 501 and the service communications device combine the respective generated part with the corresponding received part to a link key.

Based on the generated link key an authentication sequence 512 is performed. If the authentication 512 succeeds, the resulting link key may be stored in the internal database 515 of the PANU 501 and the system database 517 of the NAP for later use. Furthermore, an encryption key may be derived from the link key and used for setting up an encryption 513 for the established link. Since the user communications device 501 may have limited memory capabilities, a group unit key is preferably used as a link key as described below.

Figure 5B:
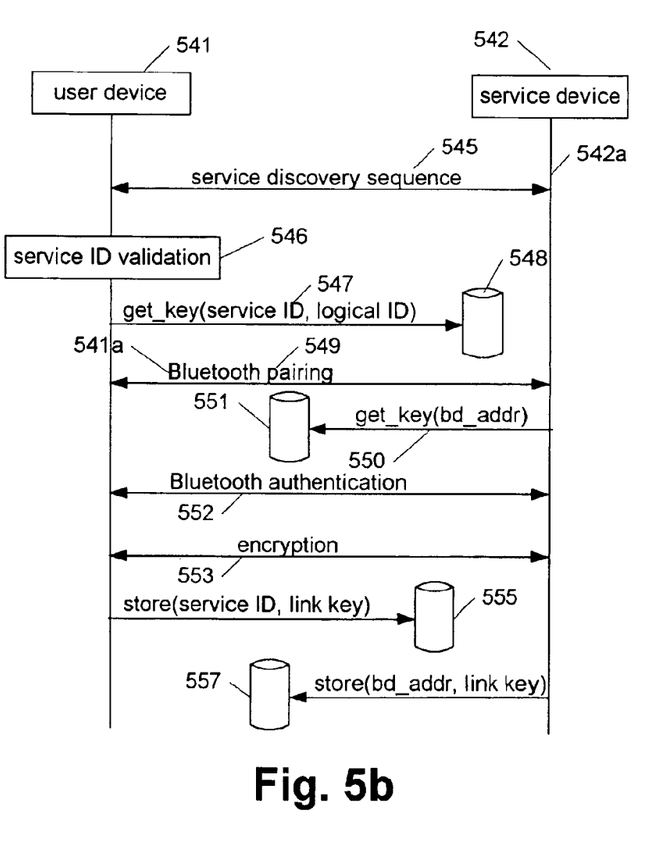
FIG. 5b shows a second example of the message flow of an initial session between a user communications device and a service communications device according to an embodiment of the invention.

FIG. 5b illustrates a second example of the message flow of an initial session between a user communications device and a service communications device according to an embodiment of the invention. Initially, during a service discovery sequence 545, the user communications device 541 may perform an inquiry procedure in order to discover the service communications device 542, or the user communications device 541 may be paged by the service communications device 542. The user communications device may further receive a service ID during the service discovery sequence 545. In step 546, the user communications device 541 verifies whether the received service ID corresponds to the desired service.

If the user communications device 541 and the service communications device 542 do not share a common link key, a pairing based upon a passkey is initiated. The passkey is distributed in advance and associated with the service provider identity. The user communications device 541 may look up the received service ID in the internal database 548, e.g. via a "get key" function 547, and find the associated passkey. If no record exists, the session may be terminated or continued without enabling any security.

Based on the passkey, a pairing sequence 549 may be initiated. During the pairing, the service communications device 542 may look up the passkey in a system database 551 based on the BD_ADDR of the user communications device.

Furthermore, a link key is generated during the pairing, as described in connection with FIG. 5a.

Based on the generated link key an authentication sequence 552 is performed. If the authentication 552 succeeds, the resulting link key may be stored in the internal database 555 of the PANU 541 and the system database 557 of the NAP for later use. Furthermore, an encryption key may be derived from the link key and used for setting up an encryption 553 for the established link. Since the user communications device 541 may have limited memory capabilities, a group unit key is preferably used as a link key as described below.

Figure 5C:
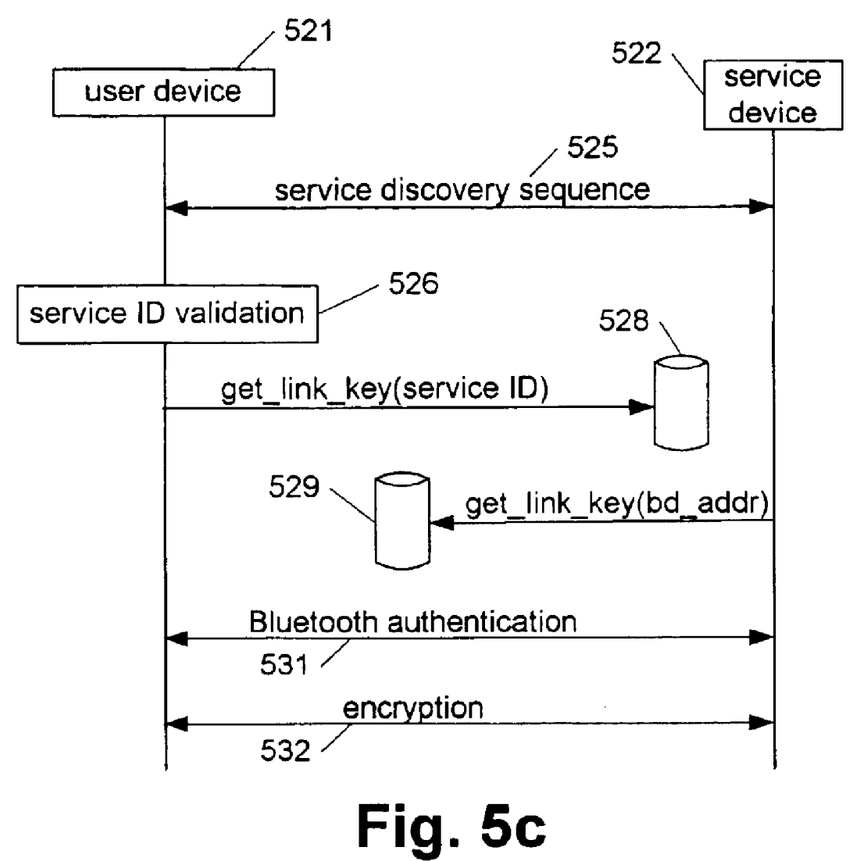
FIG. 5c illustrates the message flow of a subsequent session between a user communications device and a service communications device according to an embodiment of the invention.

FIG. 5c illustrates the message flow of a subsequent session between a user communications device 521 and a service communications device 522 according to an embodiment of the invention. In situations where a PANU has been registered on the system and a link key has been exchanged, the pairing procedure can be omitted. This situation may arise if the PANU connects to a NAP of a system which has previously been visited, or during a handover between NAP's of the same system.

Like in the previous example, during an initial service discovery sequence 525, the user communications device 521 may perform an inquiry procedure or may be paged by the service communications device 522. A service ID is sent from the service communications device 522 to the user communications device 521, followed by a service ID validation 526. As a link has previously been established for this service, the link key may be looked up from an internal database 528 of the user communications device 521 and from the system database 529 of the service communications device, respectively. Based on the link key, authentication 531 and encryption 532 may be established.

Hence, this security scheme reduces the communications load as it reuses information from previous sessions.

Alternatively, depending on the information in the NAP service record, authentication and/or encryption may be omitted. In addition to the link key, the encryption function may require a cipher offset as input.

Additionally, on top of the Bluetooth security mode in which the NAP is operating, it may demand security at Ethernet layer (802.1x), IP layer (IPsec) or higher layer/application security. This may be achieved on a per-connection basis or a per-service basis.

Furthermore, the accessed services within the network may demand additional higher layer security, e.g. IPsec or security mechanisms at the transport layer or above. This may be implemented on top of any of the security configurations described above. The SDP service record of the NAP may state the Bluetooth security requirements for accessing the service, e.g. the applicable Bluetooth security mode.

As a complement to distributing passkeys between nodes it is possible to use a common seed from the higher layer security protocol.

Figure 6A:
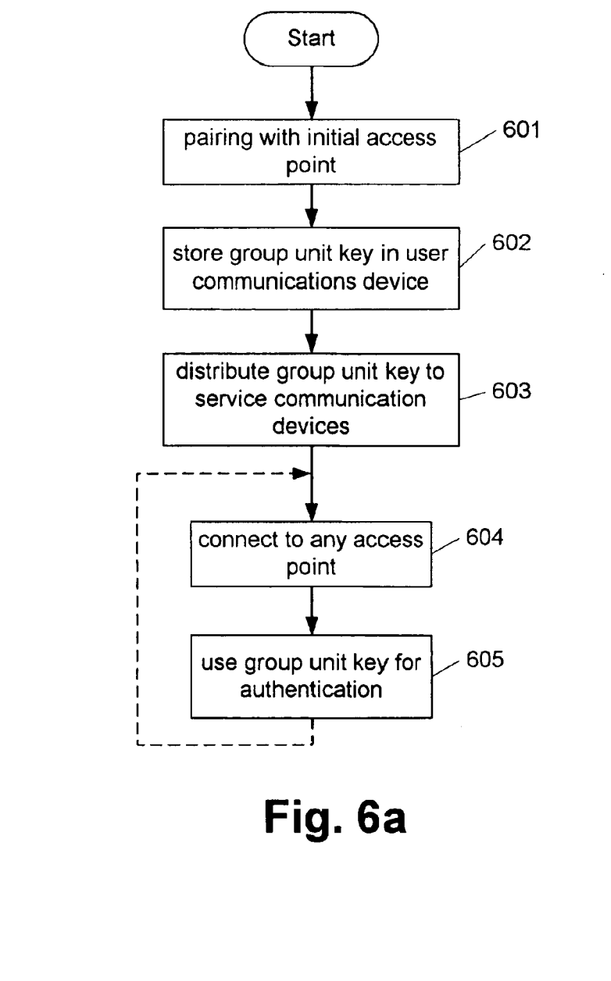
FIG. 6a shows a flow diagram of a method of using access key codes for a service according to an embodiment of the invention.

Now referring to FIG. 6a, a method of using access key codes for a service according to an embodiment of the invention comprises, in step 601, an initial connection and pairing with an access point. During the initial pairing procedure 601, for example as described in connection with FIG. 5a, a user communications device stores, in step 602, a group unit key which is used by this user communications device for one particular service. Preferably, this initial pairing is only performed once when the user subscribes to the service at a service access point. In step 603, the group unit key is distributed to all service communications devices providing this particular service, e.g. via any secure network connection protected by standard methods, such as TLS (see T. Dierks and C. Allen, "The TLS Protocol Version 1.0", IETF RFC 2246, ftp://ftp.isi.edu/in-notes/rfc2246.txt) or IPsec (see Atkinsson. R., "Security Architecture for the Internet Protocol", IETF RFC 2401, ftp://ftp.isi.edu/in-notes/rfc2401.txt). Alternatively, the group unit keys may not be distributed to all transceivers, but, during unit authentication, the transceivers may connect on-line over a network to a central database where all group unit keys and their corresponding Bluetooth addresses are stored. Preferably, the database connection is protected, e.g. by any standard method (e.g. TLS, IPSec). Subsequently, in step 604, the user communications device may connect to other service communications devices providing this service and use the stored group unit key for authentication 605.

Figure 6B:
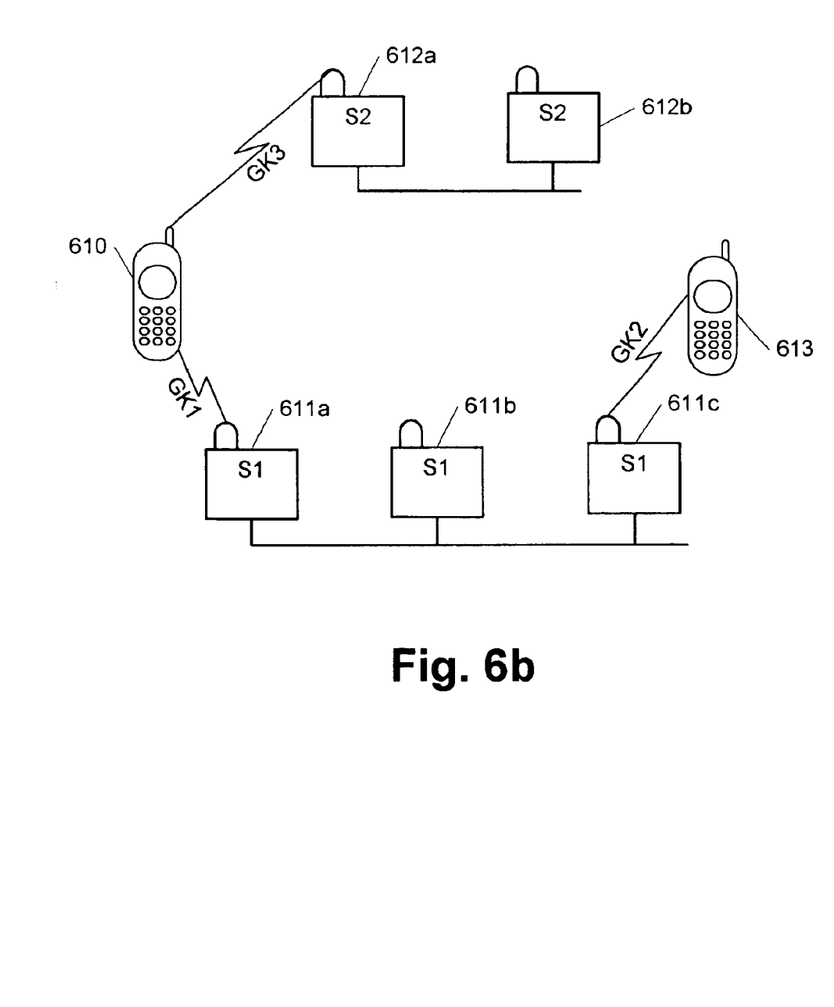
FIG. 6b illustrates the use of group unit keys for accessing multiple service communications devices providing different services.

Now referring to FIG. 6b, a user communications device 610 may have stored several access key codes, one for each service to which it has subscribed, the so-called group unit keys. A group unit key may give one user communications device 610 access to a number of service communications devices, e.g. the group unit key labelled GK1 in FIG. 6b may grant to the user communications device 610 access to the service communications devices 611a–c which provide a given service, labelled S1 in FIG. 6b. If a different user communications device 613 connects to one of the service communications devices 611a–c of service S1, e.g. the service communications device 611c, a different unit key GK2 will be used for authentication. If the user communications device 610 establishes a link to a service communications device 612a of a different service S2, a different group unit key GK3 is used for authentication.

Hence, before or in connection with a subscription to a service, a group unit key is generated and stored in the user communications device 610 for that particular service. For example, the group unit key may be established and exchanged during an initial subscription session, e.g. with a service access point 104 shown in FIG. 1 and, preferably, according to a method described in connection with FIG. 5a.

Later, when the user of the unit would like to utilise the service, he or she may manually configure his/her user communications device to use a selected group unit key for subsequent connections. The user may, for example, select, e.g. via the keypad, a group unit key from a list of possible group unit keys displayed on the display of the user communications device. The list of group unit keys may, for example, be labelled by the names of the corresponding services. The group unit key may also be selected by a higher-layer service protocol as described in connection with FIG. 5c.

Furthermore, the user may configure his/her user communications device to use combination keys for some connections and allow group unit keys for other types of connections. For example, the key memory in the user communications device may comprise a table as indicated in table 2.

TABLE 2 key table in user communications device

| Service | BD_Address | Usage | Key |
|---|---|---|---|
| subway X | Any | User set | AB124223 23E23A12 1264BEF1 A2845D28B |
| museums city B | Any | service discovery | |
| Train comp A | EC423******** | User set | 2343AF23 6496ECA A68BEA396 9464B47E |
| Any | 3FA12437BC453 | Always | 23BD378A 93678928 AB2784BD FE376925 |
| Any | D234BD6A24E9 | Always | 374535937 2691A373 12FD2839 CF331749 |

In table 2, the first column indicates the name and/or identifier of the associated service. The second column indicates the range of accepted device addresses using a wildcard notation where, in the example of table 2, '*' indicates any alphanumeric character. The third column indicates when the associated link key should be used, and the fourth column contains the actual link keys. In the example of table 2, the first three link keys are group unit keys, while the last two link keys are combination keys. The records corresponding to combination keys have the BD_Address filled with the device address of the corresponding Bluetooth unit. The first record corresponds to a group unit key valid for a subway service where the key may be used irrespective of the BD_ADDR of the other Bluetooth unit, but where the use of the key has to be selected manually by the user. The second record corresponds to a group unit key to be used when entering the museums of city B, again irrespective of the BD_ADDR of the other Bluetooth unit. However, in this case, this group unit key may be selected on the basis of a service discovery sequence, as described in connection with FIGS. 5a–c. The third group unit key to be used for the train company A is used when selected by a user, but only in connection with other Bluetooth devices with a BD_ADRR starting with "EC423".

What is claimed is:

1. A method of granting, to a user communications device, access to a service provided by a plurality of service communications devices, the method comprising the steps of
    initiating a first communications link between the user communications device and a first one of the plurality of service communications devices;
    generating an access key code;
    storing a first data item in a first storage means of the user communications device, the first data item indicating the access key code;
    characterised in that the access key code is indicative of the user communications device and the service; and the method further comprises the steps of
    making the access key code available to at least a second one of the plurality of service communications devices via a communications network;
    initiating a second communications link between the user communications device and the second service communications device; and
    using the access key code to mutually authenticate the user communications device and the second service communications device.

2. A method according to claim 1, characterised in that
    the user communications device and the plurality of service communications devices each comprise a Bluetooth communications unit;
    the first and second communications links are Bluetooth communications links;
    the access key code is a baseband link key; and
    the step of generating an access key code is part of a Bluetooth pairing procedure.

3. A method according to claim 1, characterised in that the user communications device is a mobile radio terminal.

4. A method according to claim 1, characterised in that the first service communications device is a designated subscription communications device.

5. A method according to claim 1, characterised in that the method further comprises the steps of
    transmitting a service identification code from the first service communications device to the user communications device via the first communications link;
    storing a second data item in the first storage means in relation to the access key code, the second data item indicating the service identification code; and
    the step of using the access key code to mutually authenticate the user communications device and the second service communications device further comprises the steps of
    transmitting the service identification code from the second service communications device to the user communications device via the second communications link; and
    retrieving, based on the service identification code, the access key code from the first storage means.

6. A method according to claim 1, characterised in that the method further comprises the step of using the access key code to generate an encryption key for encrypting the second communications link.

7. A method according to claim 1, characterised in that the step of generating an access key code comprises the steps of generating a first part of the access key code in the user communications device; generating a second part of the access key code in the first service communications device; transmitting the first part of the access key code from the user communications device to the first service communications device; and transmitting the second part of the access key code from the first service communications device to the user communications device.

8. A method according to claim 1, characterised in that the step of making the access key code available to at least a second one of the plurality of service communications devices via a communications network comprises the steps of transmitting the access key code to the second service communications device; and storing a third data item in a second storage means of the second service communications device, the third data item indicating the access key code.

9. A method according to claim 1, characterised in that the step of making the access key code available to at least a second one of the plurality of service communications devices via a communications network comprises the step of storing a fourth data item in a database, the fourth data item indicating the access key code; and the step of using the access key code to mutually authenticate the user communications device and the second service communications device comprises the steps of retrieving the access key code from the database; and transmitting the retrieved access key code via the communications network to the second service communications device.

10. A communications system comprising a user communications device, a first and a second service communications device, the first and second service communications devices each providing a service;

the user communications device and the first and second service communications devices each including a respective transmit/receive unit for transmitting and receiving data signals via respective communications links between the user communications device and a selected one of the first and second service communications devices;

a selected one of the user communications device and the first service communications device comprising first processing means adapted to generate at least a part of an access key code during an initialisation procedure of a first communications link between the user communications device and the first service communications device, the access key code being indicative of the user communications device and the service;

the user communications device including first storage means adapted to store a first data item indicating the access key code; and second processing means adapted to retrieve the access key code from the first storage means and to use the retrieved access key code during an authentication procedure of a second communications link between the user communications device and the second service communications device;

the system including a communications network interconnecting the first and second service communications devices and adapted to make the access key code available to at least the second service communications device;

the second service communications device including third processing means adapted to receive the access key code via the communications network and to use the received access key code during the authentication procedure of the second communications link.

11. A communications system according to claim 10, characterised in that the transmit/receive units of the user communications device and the first and second service communications devices each comprise a Bluetooth communications unit;

the first and second communications links are Bluetooth communications links;

the access key code is a baseband link key; and the initialisation procedure is a Bluetooth pairing procedure.

12. A communications system according to claim 10, characterised in that the user communications device is a mobile radio terminal.

13. A communications system according to claim 10, characterised in that the first service communications device is a designated subscription communications device.

14. A communications system according to claim 10, characterised in that the first service communications device is adapted to transmit a service identification code to the user communications device via the first communications link;

the first storage means is adapted to store, in relation to the access key code, a second data item indicating the service identification code;

the second service communications device is adapted to transmit the service identification code to the user communications device via the second communications link during the authentication procedure; and the second processing means is adapted to retrieve, based on the service identification code, the access key code from the first storage means.

15. A communications system according to claim 10, characterised in that a selected one of the second and third processing means is adapted to generate an encryption key for encrypting the second communications link on the basis of the access key code.

16. A communications system according to claim 10, characterised in that the second service communications device further comprises second storage means adapted to store a third data item indicating the access key code.

17. A communications system according to claim 10, characterised in that the system further comprises a third storage means connected to the communications network and adapted to store a fourth data item indicating the access key code; and the third processing means is adapted to retrieve the access key code from the third storage means via the communications network.

18. A user communications device comprising a first transmit/receive unit for transmitting data signals to and receiving data signals from selected ones of a plurality of service communications devices providing a service;

first storage means adapted to store a first data item indicating an access key code generated during an initialisation procedure of a first communications link between the user communications device and a first one of the plurality of service communications devices, the access key code being indicative of the user communications device and the service;

first processing means adapted to retrieve the access key code from the first storage means and to use the retrieved access key code during an authentication procedure of a second communications link between the user communications device and a second one of the plurality of service communications devices.

19. A user communications device according to claim 18, characterised in that the first transmit/receive unit comprises a Bluetooth communications unit;

the first and second communications links are Bluetooth communications links;

the access key code is a baseband link key; and the initialisation procedure is a Bluetooth pairing procedure.

20. A user communications device according to claim 18, characterised in that the user communications device is a mobile radio terminal.

21. A user communications device according to claim 18, characterised in that the first transmit/receive unit is adapted to receive a service identification code from the first service communications device via the first communications link;

the first storage means is adapted to store, in relation to the access key code, a second data item indicating the service identification code; and the first transmit/receive unit is further adapted to receive, during the authentication procedure, the service identification code from the second service communications device via the second communications link; and the first processing means is adapted to retrieve, based on the service identification code, the access key code from the first storage means.

22. A user communications device according to claim 18, characterised in that the first processing means is adapted to generate an encryption key for encrypting the second communications link on the basis of the access key code.

23. A user communications device according to claim 18, characterised in that the user communications device further comprises second processing means adapted to generate at least a part of the access key code.

24. A communications system comprising a first and a second service communications device each providing a service;

the first service communications device including a first transmit/receive unit for transmitting data signals to and receiving data signals from a user communications device via a first communications link;

first processing means adapted to perform an initialisation procedure of the first communications link, the initialisation procedure including the generation of an access key code indicative of the user communications device and the service;

the system including a communications network interconnecting the first and second service communications devices and adapted to make the access key code available to at least the second service communications device;

the second service communications device including a second transmit/receive unit for transmitting data signals to and receiving data signals from the user communications device via a second communications link;

second processing means adapted to receive the access key code via the communications network and to use the received access key code during an authentication procedure of the second communications link.

25. A communications system according to claim 24, characterised in that the first processing means is adapted to generate at least a part of the access key code.

* * * * *

UNITED STATES PATENT AND TRADEMARK OFFICE
CERTIFICATE OF CORRECTION

| | | |
|---|---|---|
| PATENT NO. | : 7,020,456 B2 | Page 1 of 1 |
| APPLICATION NO. | : 10/005080 | |
| DATED | : March 28, 2006 | |
| INVENTOR(S) | : Ben Smeets, Christian Gehrmann and Allan Bøgeskov | |

It is certified that error appears in the above-identified patent and that said Letters Patent is hereby corrected as shown below:

Col. 1, line 5

Change "This application claims benefit of 60/257,149 filed Dec. 22, 2000." to
--This application claims priority under 35 U.S.C. §§ 119 and/or 365 to PA 200001844 filed in Denmark on Dec. 8, 2000; to 60/257,149 filed in The United States of America on Dec. 22, 2000; and to 01610019.0 filed in Europe on Mar. 6, 2001, the entire content of which is hereby incorporated by reference.--

Col. 15, line 42

Change "CF331749" to --CF381749--.

Signed and Sealed this

Twelfth Day of December, 2006

JON W. DUDAS
*Director of the United States Patent and Trademark Office*